(12) United States Patent
Benhase et al.

(10) Patent No.: US 8,099,634 B2
(45) Date of Patent: Jan. 17, 2012

(54) AUTONOMIC COMPONENT SERVICE STATE MANAGEMENT FOR A MULTIPLE FUNCTION COMPONENT

(75) Inventors: Linda V. Benhase, Tucson, AZ (US); Basheer N. Bristow, Vail, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 12/207,287

(22) Filed: Sep. 9, 2008

(65) Prior Publication Data

US 2010/0064164 A1 Mar. 11, 2010

(51) Int. Cl.
*G06F 11/00* (2006.01)

(52) U.S. Cl. ............ 714/44; 714/3; 714/6.32; 714/46; 714/57

(58) Field of Classification Search ............ 714/7, 44, 714/46, 57, 6.32, 3
See application file for complete search history.

(56) References Cited

U.S. PATENT DOCUMENTS

| | | | |
|---|---|---|---|
| 5,675,724 A | | 10/1997 | Beal et al. |
| 6,691,243 B1 * | | 2/2004 | Belgardt et al. .......... 714/3 |
| 6,826,683 B1 * | | 11/2004 | Suermondt et al. ........ 713/100 |
| 7,012,815 B2 * | | 3/2006 | Garnett et al. ............ 361/825 |
| 7,103,789 B2 * | | 9/2006 | Ahrens et al. ............ 713/340 |
| 7,129,851 B1 * | | 10/2006 | Garnett .................. 340/815.4 |
| 7,155,350 B2 | | 12/2006 | Kagan |
| 7,231,490 B2 | | 6/2007 | Kanai |
| 7,234,085 B2 * | | 6/2007 | Ahrens et al. ............ 714/57 |
| 7,295,442 B2 * | | 11/2007 | Garnett et al. ............ 361/728 |
| 7,313,489 B2 | | 12/2007 | Kagan |
| 7,320,051 B2 | | 1/2008 | Kanai |
| 7,398,432 B2 * | | 7/2008 | Arbeitman et al. ......... 714/57 |
| 7,684,961 B1 * | | 3/2010 | Robillard et al. .......... 702/183 |
| 2002/0099873 A1 * | | 7/2002 | Hileman et al. ............ 710/1 |
| 2002/0158770 A1 * | | 10/2002 | Ahmed et al. ............ 340/686.4 |
| 2007/0220301 A1 * | | 9/2007 | Brundridge et al. ........ 714/4 |
| 2008/0148109 A1 * | | 6/2008 | Bashor et al. ............ 714/57 |

OTHER PUBLICATIONS

Definition of "ANSI/VITA 40-2003." Wikipedia.org. retrieved Sep. 3, 2010.*

* cited by examiner

*Primary Examiner* — Philip Guyton
(74) *Attorney, Agent, or Firm* — Stephen R. Tkacs; Stephen J. Walder, Jr.; Randall J. Bluestone (57) ABSTRACT

A mechanism is provided for autonomic component service state management for a multiple function component. The mechanism determines whether independent functions within a multiple function service boundary can be serviced. When a single function experiences a failure that requires service, repair, or replacement, the surviving functions notify the service management software of the state of the independent functions. The service management software then determines the state of the overall component and implements the appropriate service method.

16 Claims, 5 Drawing Sheets

AUTONOMIC COMPONENT SERVICE STATE MANAGEMENT FOR A MULTIPLE FUNCTION COMPONENT

BACKGROUND OF THE INVENTION

1. Field of the Invention

The present application relates generally to an improved data processing apparatus and method and more specifically to an apparatus and method for autonomic component service state management for a multiple function component.

2. Background of the Invention

Advancements in computing devices and mechanical packaging have created denser packing concepts. For example, in some systems, a collection of servers is interconnected into a server system, sharing high-speed fabric topologies, such as in BladeCenter® systems. "BladeCenter" is a trademark of International Business Machines Corporation in the United States, other countries, or both. A BladeCenter® system is a server architecture that houses multiple server modules ("blades") in a single chassis. Blade servers are widely used in data centers to save space and improve system management. Either self-standing or rack mounted, the chassis provides the power supply. Each blade may have its own CPU, memory, and hard disk. Blade servers generally provide their own management systems and may include a network or storage switch.

In some cases, multiple related but independent functions, such as processors, storage, and memory systems, for example, are combined into a single component package. With multiple intelligent functions, it is possible for one of the functions to experience a failure that requires service, repair, or replacement, while the remaining functions contained within the multiple function component service boundary may remain operable and performing normally.

A customer replaceable unit (CRU), sometimes referred to as a field replaceable unit (FRU), is a circuit board, part, or assembly that can be quickly and easily removed from a data processing system or other piece of electronic equipment and replaced by the customer or a technician without having to send the entire product or system to a repair facility. In some implementations, CRUs have an indicator light that notifies a customer or technician that a CRU is ready for service. If a component fails, a function of the CRU activates a ready-for-service indicator, which indicates that the customer may safely remove the CRU for service. The customer may then have the CRU repaired or replaced.

BRIEF SUMMARY OF THE INVENTION

In one illustrative embodiment, a computer program product comprises a computer recordable medium having a computer readable program recorded thereon. The computer readable program, when executed on a computing device, causes the computing device to notify a component service management module of the failed component responsive to a function within the multiple function component failing. The computer readable program further causes the computing device to determine, by the component service management module, a component ready-for-service state for the multiple function component and initiate a service action responsive to the component ready-for-service state indicating that the multiple function component is ready for service. Determining the component ready-for-service state comprises reporting the component ready-for-service state to a global service management module and determining, by the global service management module, the component ready-for-service state based on whether service of the multiple function component will cause an outage with another component in the data processing system.

In another illustrative embodiment, a method, in a data processing system, for component service state management for a multiple function component within the data processing system is provided. The method comprises notifying a component service management module of a failed function responsive to the function within the multiple function component failing. The component service management module is associated with a leader function within the multiple function component. The method further comprises determining, by the component service management module, a component ready-for-service state for the multiple function component and initiating a service action responsive to the component ready-for-service state indicating that the multiple function component is ready for service.

In another illustrative embodiment, a multiple function component comprises a plurality of function controllers, a light manager, and a light controller. Each function controller within the plurality of function controllers is associated with a function in the multiple function component. Responsive to a given function controller within the plurality of function controllers sending an indication of a failure of its respective function, the light controller sends a notification of the failure to the light manager. The light controller receives the indication of a failure via a general purpose input/output module that converts discrete signals to an inter-integrated circuit signal. Responsive to the notification of the failure, the light manager determines a component ready-for-service state for the multiple function component. Responsive to the component ready-for-service state indicating that the multiple function component is ready for service, the light manager initiates a service action.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

The illustrative embodiments provide a mechanism for autonomic component service state management for a multiple function component. The mechanism determines whether independent functions within a multiple function service boundary can be serviced. When a single function experiences a failure that requires service, repair, or replacement, the surviving functions notify the service management software of the state of the independent functions. The service management software then determines the state of the overall component and implements the appropriate service method.

Figure 1:
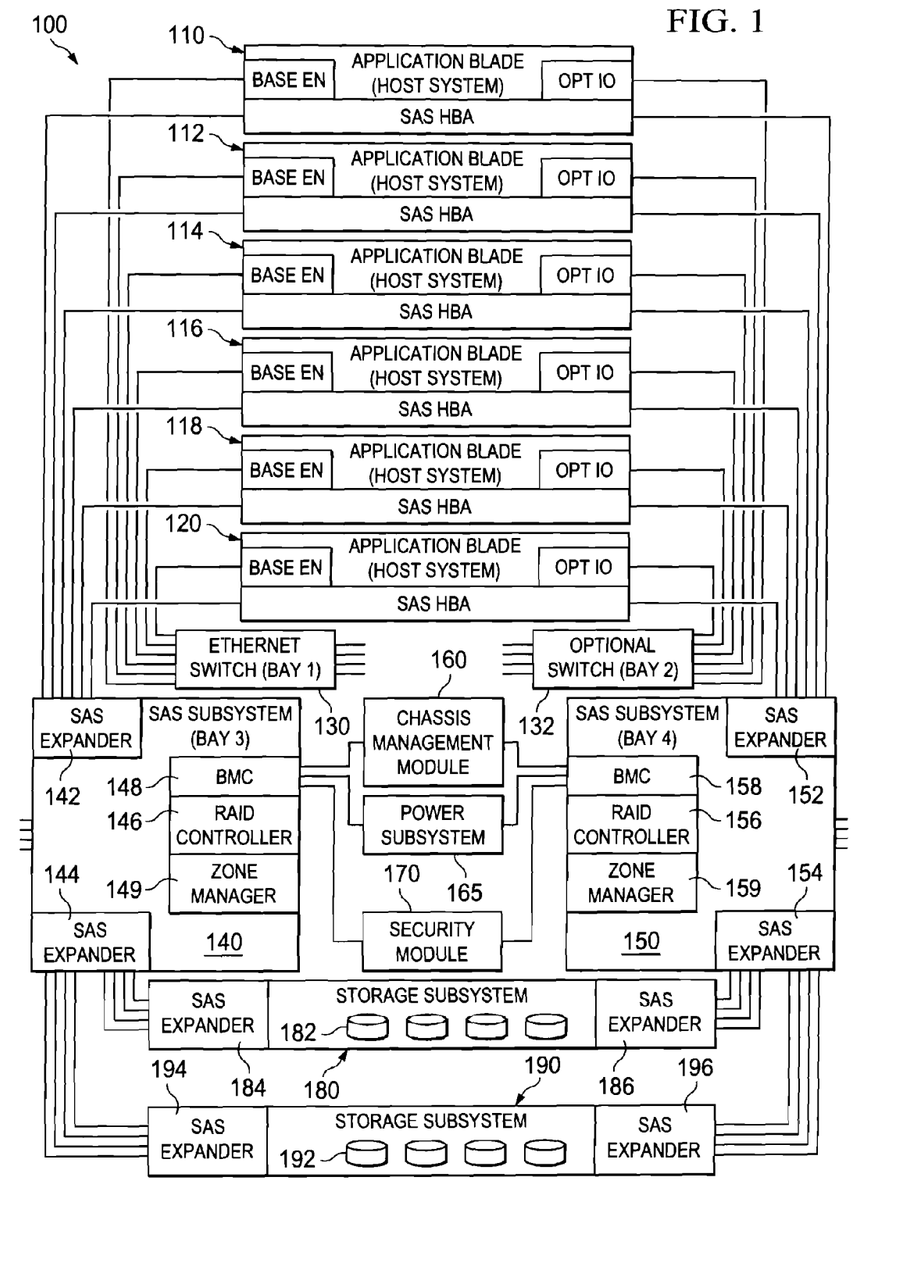
FIG. 1 is a diagram illustrating an example of a data processing system in which aspects of illustrative embodiments may be implemented.
Figure 2:
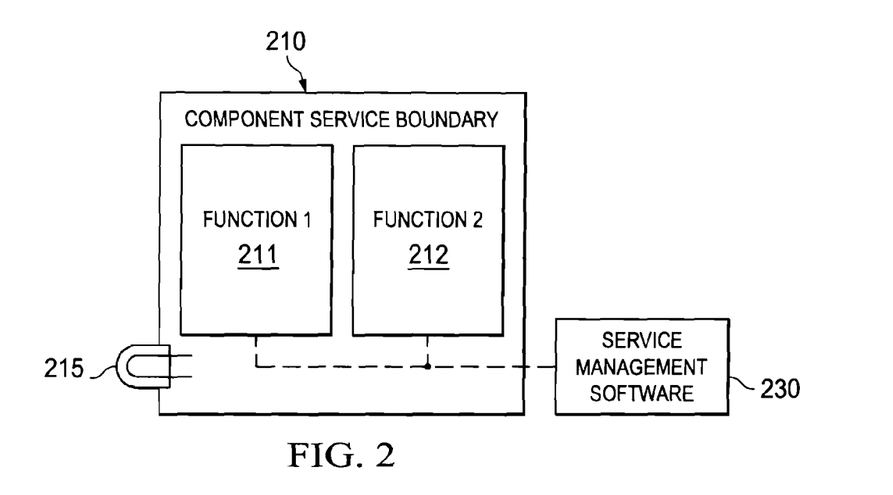
FIG. 2 is a block diagram illustrating a multiple function component in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments and embodiments in which multiple function components may experience failure of individual functions within the component.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 is a diagram illustrating an example of a data processing system in which aspects of illustrative embodiments may be implemented. As shown in FIG. 1, the data processing system may be provided in a chassis 100, such as a BladeCenter® chassis available from International Business Machines Corporation of Armonk, N.Y. Within the chassis 100, a plurality of host servers or host systems may be provided on application blades 110-120. Each host servers 110-120 may have one or more input/output adapters including a base Ethernet (base EN) adapter for communication with an Ethernet switch 130, an optional I/O (opt I/O) adapter for communication with an optional switch 132, and SAS host bus adapter (SAS HBA) for communication with SAS subsystems 140 and 150. In addition to these elements, a chassis management module 160, power subsystem 165, and security module 170 may be provided within the chassis 100 for performing various management, power, and security functions. The elements of the chassis 100 communicate with one another via a SAN fabric.

The SAN fabric may include connections, such as wired links, wireless communication links, fiber optic cables, or the like. The SAN fabric may utilize one or more communication protocols including, for example, Fibre Channel, Ethernet, or the like. In the depicted example, the SAN fabric uses SAS to communicate between the application blades 110-120 and the storage subsystems 180 and 190 via the SAS subsystems 140 and 150.

The SAS subsystems 140 and 150 operate as switches in the SAN fabric and controllers for accessing the storage subsystems 180 and 190. As shown in FIG. 1, the storage subsystems 180 and 190 are comprised of a plurality of storage devices 182 and 192, respectively, which are accessed via one or more SAS expanders 184, 186, 194, and 196. The storage devices 182 and 192 may comprise a single disk drive, tape drive, optical drive, or a plurality of such storage devices, such as in a disk array. For example, the storage device 182 may comprise a disk array, such as a Redundant Array of Independent Disks (RAID) system with the disk devices in the RAID system being Just a Bunch of Disks (JBOD) devices and/or Switched Bunch of Disks (SBOD) systems.

The SAS subsystems 140 and 150 may themselves comprise a host side SAS expander 142, 152, and a storage subsystem side SAS expander 144, 154. The SAS expanders 142, 144, 152, 154, 184, 186, 194, and 196 may be configured to support zoning. Moreover, the SAS subsystems 140 and 150 may further comprise storage subsystem controllers, such as RAID controllers 146 and 156, blade management controllers (BMC) 148 and 158, and at least one zone manager 149 and 159. The RAID controllers 146 and 156 perform various control operations for controlling operation and access to the storage subsystems 180 and 190. The BMCs 148 and 158 perform various management operations for managing the application blades 110-120 of the chassis 100. The BMCs 148 and 158 may communicate with the chassis management module 160 to obtain vital product data (VPD) for the various application blades 110-120 and storage subsystems 180 and 190.

As seen in FIG. 1, chassis 100 may contain many multiple function components, such as application blades, SAS subsystems, storage subsystems, and the like. These multiple function components may be embodied in a blade or other self-contained package that is easily removed and replaced. A multiple function component may take the form of a customer replaceable unit (CRU), which is a circuit board, part, or assembly that can be quickly and easily removed from a data processing system or other piece of electronic equipment and replaced by the customer or a technician without having to send the entire product or system to a repair facility. For example, a blade may have its own CPU, memory, and hard disk, where each function within the blade may operate independently.

FIG. 2 is a block diagram illustrating a multiple function component in which aspects of the illustrative embodiments may be implemented. Function 1 211 and function 2 212 exist within component service boundary 210. In accordance with an illustrative embodiment, a mechanism is provided that allows component service boundary 210 to self-manage its readiness for service. Each independent function 211, 212 is configured to determine and report its independent ready-for-service state and, upon demand of service management software 230, place the function in a state that can be serviced.

When a single function experiences a failure that requires service, repair, or replacement, the mechanism enables the functions 211, 212 to communicate the current function state to service management software 230. The surviving functions notify service management software 230 of the state of the independent functions. Service management software 230 may then determine the state of the overall component service boundary 210 and implements the appropriate service method.

Service management software 230 may run within the component and may provide service management for the individual component. In one embodiment, service management software 230 may determine the state of the overall component service boundary based on the functions 211, 212 themselves. For example, function 1 211 may be capable of continuing operation without function 2 212 being operable. On the other hand, function 2 212 may be dependent on function 1 211 to operate normally and safely. In addition, function 1 211 may require certain operations to be performed in order to be ready for service, while function 2 212 may be ready for service immediately when a failure is experienced.

Furthermore, service management software 230 may determine the state of the overall component service boundary 210 based on other components in the system. For example, function 1 211 may perform a service that other components in the system require for safe operation, and service management software 230 may delay putting the component in a state of being ready for service until other components in the system have failed over to another component. Conversely, service management software 230 may learn of a failed component elsewhere in the system on which one of the functions 211, 212 depends, and may perform operations to prepare component service boundary 210 for the eventual ready-for-service state of the failed component.

In one embodiment, when component service boundary 210 is ready for service, the component activates ready-for-service indicator 215. Indicator 215 indicates that the customer may safely remove the component for service. The customer may then have the component repaired or replaced. Ready-for-service indicator 215 may be a light emitting diode (LED), for example.

Figure 3A:
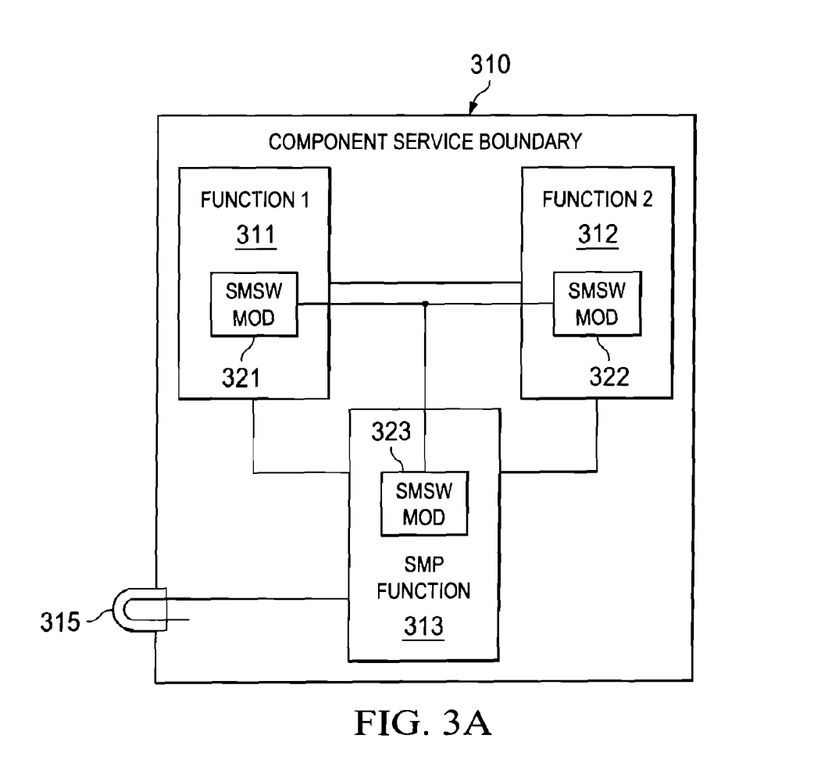
FIGS. 3A and 3B illustrate component service management with distributed service management in accordance with the illustrative embodiments.
Figure 3B:
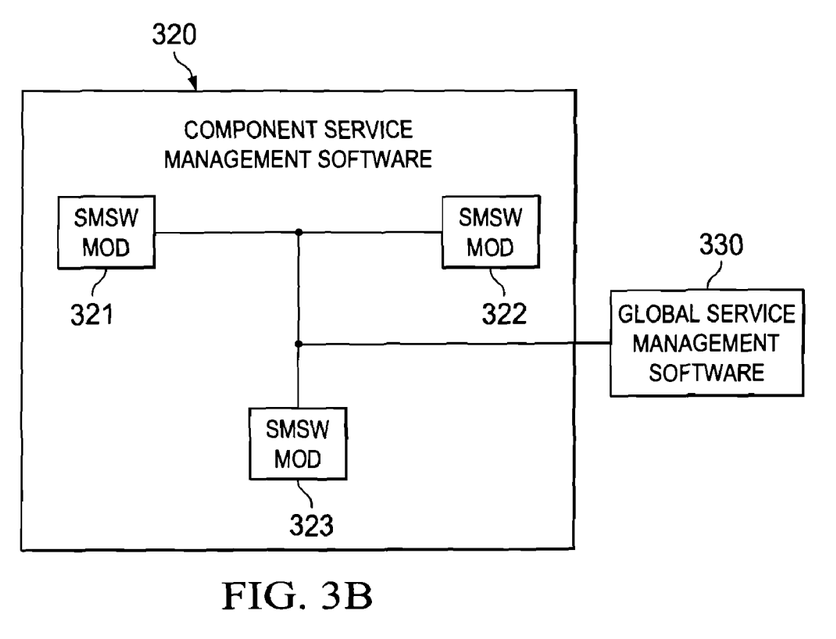

FIGS. 3A and 3B illustrate component service management with distributed service management in accordance with the illustrative embodiments. More particularly, with reference to FIG. 3A, function 1 311 and function 2 312, as well as service management processor (SMP) function 313, exist within component service boundary 310. Function 1 311 includes service management software (SMSW) module 321; function 2 312 includes SMSW module 322; and, service management processor function 313 includes SMSW module 323. Each SMSW module 321-323 enables its function to participate in the management of the service state of component service boundary 310. A SMSW module is at a minimum some hardware running within its function, but may include some hardware. Therefore, each SMSW module 321-323 may be hardware, software, or a combination of hardware and software.

For each independent function 311-313 within the multiple function component service boundary 310, a set of criteria is established that allows an operable functional component to determine if it is in a state where an autonomic service readiness state can be enabled. When component service boundary 310 is ready for service, the component activates ready-for-service indicator 315. Indicator 315 indicates that the customer may safely remove the component for service. The customer may then have the component repaired or replaced. Ready-for-service indicator 315 may be a light emitting diode (LED), for example.

Turning to FIG. 3B, component service management software 320 comprises SMSW modules 321-323, which may communicate with global service management software 330. SMSW modules 321-323 may be configured to determine which one of SMSW modules 321-323 is responsible for self management of the component service boundary 320. A hierarchical relationship of succession may designate a service management leader.

For example, according to an example defined relationship, if function 2 312 is available, then it is always the leader function. If function 2 312 is not available, and function 1 311 is available, then function 1 311 is the leader function. And, if neither function 1 311 nor function 2 312 is available, then the system management processor function 313 is the leader function. In this example, if function 2 312 is the leader and function 1 311 experiences a failure that requires service of the component, then function 2 312 will be in the service management leader role. Function 2 312 ascertains the state of function 1 311 and determines its own state of readiness for service. If function 2 312 determines that function 1 311 is ready for service and that function 2 312 itself is ready for service, then function 2 312 implements the appropriate service method. Global service management software 330 determines the state of the overall component and sets the appropriate indicator state in support of the service mode. Global service management software 330 may run on chassis management module 160 or blade management controllers (BMC) 148 and 158 in FIG. 1, for example.

Light path service (LPS) mode is an example of a service indicator scheme. In LPS mode, service management software may isolate a fault to a single CRU and automatically prepare the system component for service, repair, or replacement. The repair action can be completed under the direction of light path diagnostics CRU endpoint indicators. Once the CRU is in a state of being ready for repair, the service management software sets the appropriate CRU fault indicator states according to the product platform light path diagnostics architecture definitions. The customer, or a technician, may then remove the appropriate CRU without affecting the operation of other components within the system.

Figure 4:
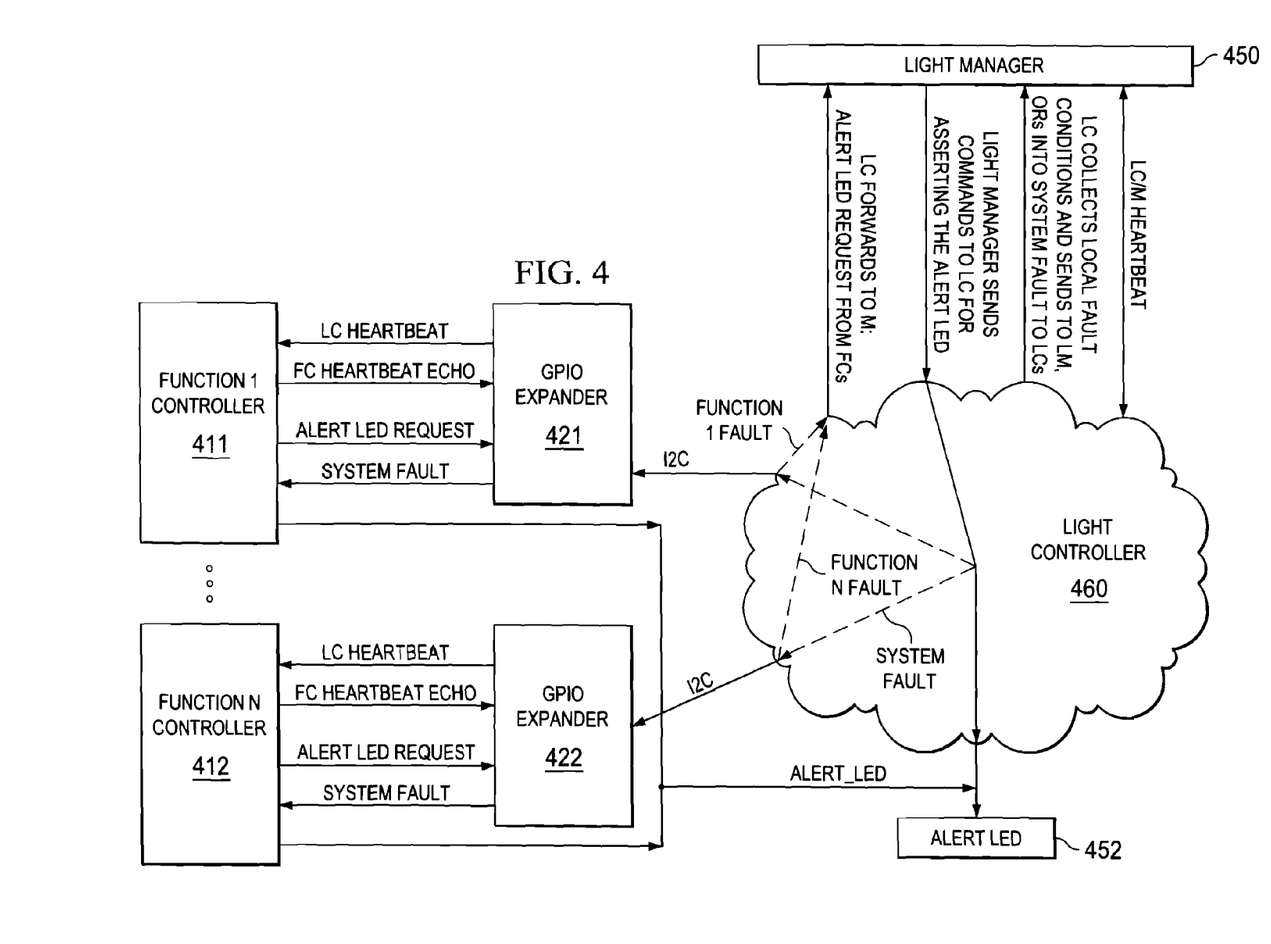
FIG. 4 illustrates a light path service system for autonomic component service state management for a multiple function component in accordance with an illustrative embodiment.

FIG. 4 illustrates a light path service system for autonomic component service state management for a multiple function component in accordance with an illustrative embodiment. As depicted in FIG. 4, light manager 450 is a functional entity that maintains control of the logical states of different functions 411-412 and light path diagnostic indicators, such as alert light emitting diode (LED) 452. Light manager 450 manipulates the states of the various indicators in response to a determination of system conditions. Light manager 450 manages the state of the light path indicators by issuing commands to light controller 460 to change the state of the indicators.

Light controller 460 is the functional entity that maintains control of the physical state of the different light path diagnostic indicators. Light controller 460 manipulates the state of the physical indicators in response to the commands from light manager 450. In the depicted example, light controller 460 does not interpret the system conditions and requires a specific command to manipulate each indicator.

During normal operation, light manager 450 manages the behavior of alert light emitting diode (LED) 452, because it has high level knowledge of when to call for service action. Light manager 450 and light controller 460 exchange heartbeat signals to notify each other of proper operation.

Light controller 460 periodically sends a light controller (LC) heartbeat signal to function controllers 411-412 via general purpose input/output (GPIO) expanders 421-422. GPIO expanders 421-422 convert inter-integrated circuit (IIC or I2C) signals to discrete signals. Each function controller (FC) 411-412, in response to a LC heartbeat, resets its watchdog timer and responds with a FC heartbeat echo signal via GPIO expanders 421-422. Light controller 460 may have multiple I2C interfaces (not shown) or may pas discrete signals among function controllers 411-412 and light manager 450. After asserting its heartbeat signal, the light controller 460 reads the FC heartbeat echo signal. If the LC heartbeat and FC heartbeat signals do not match, then light controller 460 determines that the respective function has failed and reports a failure to light manager 450.

Each function controller 411-412 has a failsafe mechanism, ALERT_LED, which takes control and asserts the alert LED 452 in the event that the light controller 460 or light manager 450 fails. Each one of function controllers 411-412 asserts the ALERT_LED signal only if the light controller (LC) heartbeat fails and it has a fault to report. In this mode, the function controller assumes the role of light manager and light controller. In all other scenarios, light manager 450 is the light manager and commands light controller 460 when to turn on/off alert LED 452.

In response to light manager 450 indicating a system fault, light controller 460 sends a system fault signal to function controllers 411-412. In response to one of function controllers 411-412 sending an alert LED request signal to light controller 460 via GPIO 421-422, light controller 460 forwards the alert LED request to light manager 450 as a function fault. Light manager 450 processes the function fault signals and determines whether to send a command to light controller 460 for asserting the alert LED 452.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
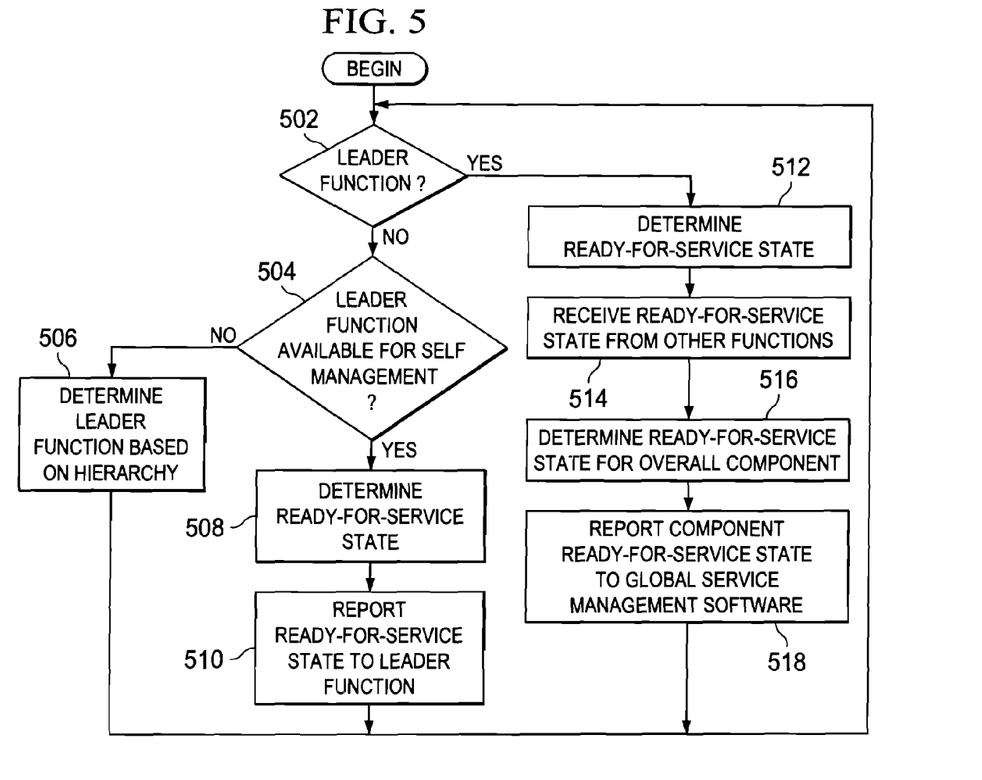
FIG. 5 is a flowchart outlining example operation of a service management software module in accordance with an illustrative embodiment.

FIG. 5 is a flowchart outlining example operation of a service management software module in accordance with an illustrative embodiment. Operation begins, and the service management software module determines whether its function is the leader function (block 502). If the service management software module determines that its function is not the leader function, the service management software module determines whether the leader function is available for self management (block 504). If the service management software module determines that the leader function has experienced a failure and is not available for self management, the service management software module determines the new leader function based on a hierarchical relationship of succession (block 506). Thereafter, operation returns to block 502 where the service management software module determines whether its function is the leader function.

If the service management software module determines that the leader function is available for self management in block 504, the service management software module determines its ready-for-service state (block 508) and reports its ready-for-service state to the leader function (block 510). Thereafter, operation returns to block 502 where the service management software module determines whether its function is the leader function.

Returning to block 502, if the service management software module determines that its function is the leader function, the service management software module determines its ready-for-service state (block 512) and receives a ready-for-service state from the other functions (block 514). Then, the service management software module determines the ready-for-service state of the overall component (block 516) and reports the component ready-for-service state to a global service management software module (block 518). Thereafter, operation returns to block 502 where the service management software module determines whether its function is the leader function.

Figure 6:
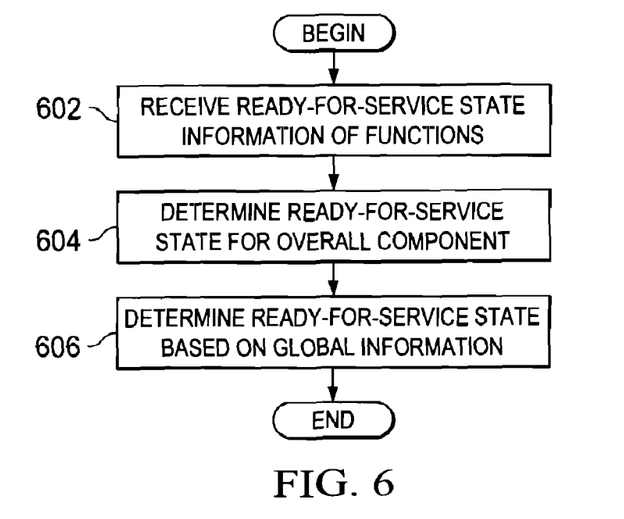
FIG. 6 is a flowchart outlining example operation of a global service management software module in accordance with an illustrative embodiment.

FIG. 6 is a flowchart outlining example operation of a global service management software module in accordance with an illustrative embodiment. Operation begins, and the global service management software module receives ready-for-service state information from a plurality of functions in a multiple function component (block 602). Then, the global service management software module determines a ready-for-service state for the overall component based on the ready-for-service state information (block 604). Alternatively, component may autonomously determine its ready-for-service state and report a ready-for-service state signal to the global service management software module.

Then, the global service management software module determines a ready-for-service state for the component based on global information (block 606). That is, the global service management software module may determine whether service of the component will result in an outage or problem with one or more other components. In this case, the global service management software module may delay asserting a ready-for-service state for the component until the other components can failover to a redundant component, for example. Thereafter, operation ends.

Thus, the illustrative embodiments provide mechanisms for autonomic component service state management for a multiple function component. The mechanism determines whether independent functions within a multiple function service boundary can be serviced. When a single function experiences a failure that requires service, repair, or replacement, the surviving functions notify the service management software of the state of the independent functions. The service management software then determines the state of the overall component and implements the appropriate service method.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer recordable medium having a computer readable program recorded thereon, wherein the computer readable program, when executed on a computing device, causes the computing device to:
   responsive to a function within a multiple function component failing, notify a component service management module of the failed component, wherein the component service management module is associated with a leader function within the multiple function component;
   determine, by the component service management module, a component ready-for-service state for the multiple function component; and
   initiate a service action responsive to the component ready-for-service state indicating that the multiple function component is ready for service,
   wherein determining the component ready-for-service state comprises:
   reporting the component ready-for-service state to a global service management module; and
   determining, by the global service management module, the component ready-for-service state based on whether service of the multiple function component will cause an outage with another component in the data processing system.

2. The computer program product of claim 1, wherein the computer readable program further causes the computing device to:
   responsive to the leader function not being available for self management, identify a new leader function within the multiple function component.

3. The computer program product of claim 1, wherein the component service management module is a light manager, wherein notifying the component service management module of the failed component comprises:
  receiving, at a light controller, an alert indicator request signal from a function within the multiple function component; and
  forwarding the alert indicator request signal to the tight manager.

4. The computer program product of claim 3, wherein initiating the service action comprises asserting, by the light manager, an alert indicator.

5. The computer program product of claim 4, wherein the alert indicator comprises an alert light emitting diode.

6. A method, in a data processing system, for component service state management for a multiple function component within the data processing system, the method comprising:
  responsive to a function within the multiple function component failing, notifying a component service management module within the data processing system of the failed function within the multiple function component, wherein the component service management module is associated with a leader function within the multiple function component;
  determining, by the component service management module, a component ready-for-service state for the multiple function component; and
  initiating a service action on the multiple function component responsive to the component ready-for-service state indicating that the multiple function component is ready for service.

7. The method of claim 6, wherein determining the component ready-for-service state comprises:
  reporting the component ready-for-service state to a global service management module; and
  determining, by the global service management module, the component ready-for-service state based on whether service of the multiple function component will cause an outage with another component in the data processing system.

8. The method of claim 6, further comprising:
  responsive to the leader function not being available for self management, identifying a new leader function within the multiple function component.

9. The method of claim 6, wherein the component service management module is a light manager, wherein notifying the component service management module of the failed component comprises:
  receiving, at a light controller, an alert indicator request signal from a function within the multiple function component; and
  forwarding the alert indicator request signal to the light manager.

10. The method of claim 9, wherein initiating the service action comprises asserting, by the light manager, an alert indicator.

11. The method of claim 10, wherein the alert indicator. comprises an alert light emitting diode.

12. A multiple function component, comprising:
  a plurality of function controllers, wherein each function controller within the plurality of function controllers is associated with a function in the multiple function component;
  a light manager; and
  a light controller,
  wherein responsive to a given function controller within the plurality of function controllers sending an indication of a failure of its respective function, the light controller sends a notification of the failure to the light manager;
  wherein the light controller receives the indication of a failure via a general purpose input/output module that converts discrete signals to an inter-integrated circuit signal;
  wherein responsive to the notification of the failure, the light manager determines a component ready-for-service state for the multiple function component; and
  wherein responsive to the component ready-for-service state indicating that the multiple function component is ready for service, the light manager initiates a service action.

13. The multiple function component of claim 12, wherein the indication of a failure comprises an alert indicator request signal.

14. The multiple function component of claim 12, wherein the light controller sends a heartbeat signal to each of the plurality of function controllers and determines whether an expected echo signal is returned from each of the plurality of function controllers.

15. The multiple function component of claim 14, wherein responsive to the light controller determining that a function controller within the plurality of function controllers does not return an expected echo signal, the light controller sends a notification of a failure to the light manager.

16. The multiple function component of claim 12, wherein initiating the service action comprises asserting, by the light manager, an alert indicator and wherein the alert indicator comprises an alert light emitting diode.

* * * * *